United States Patent Office 3,732,281
Patented May 8, 1973

3,732,281
ACRYLONITRILE DIMERS
Julian Feldman and Bernard A. Saffer, Cincinnati, Ohio, assignors to National Distillers and Chemical Corporation, New York, N.Y.
No Drawing. Continuation-in-part of application Ser. No. 271,463, Apr. 8, 1963, now abandoned. This application Nov. 26, 1971, Ser. No. 202,636
Int. Cl. C07c *121/36*
U.S. Cl. 260—465.8 D                         1 Claim

ABSTRACT OF THE DISCLOSURE 2-methyleneglutaronitrile is prepared by the dimerization of acrylonitrile in the presence of a tertiary phosphine catalyst, in a solvent which is preferably acetonitrile.

---

This application is a continuation-in-part of Ser. No. 271,463, filed Apr. 8, 1963, now abandoned.

This invention relates to methods of preparing dimers of acrylonitrile compounds. More particularly, this invention relates to the preparation of dimers from acrylonitrile compounds using as catalysts tertiary phosphines or adducts of tertiary phosphines with zerovalent nickel catalysts derived from nickel carbonyl.

It is known that conventional methods for polymerizing acrylonitrile compounds result in high molecular weight polymers. Methods of controlling the polymerization so as to obtain low molecular weight products having a definite chemical composition, and especially dimers, present a difficult problem and require special operating conditions.

In accordance with the present invention there has now been found a catalytic process for the dimerization of acrylonitrile compounds in practical yields to form unsaturated dinitriles which are reducible to diamines which are valuable, particularly in the field of synthetic fibers.

It is an object of this invention to provide a method for the conversion of acrylonitrile compounds into dimeric unsaturated dinitriles. Another object is to provide a method whereby acrylonitrile compounds are converted into dimeric unsaturated dinitriles while avoiding the formation of high molecular weight polymers in any substantial amount. Still another object is to prepare linear dimers of acrylonitrile, and particularly 2-methyleneglutaronitrile, in practical yields. Other objects will appear hereinafter.

In accordance with the present invention acrylonitrile compounds are dimerized to form unsaturated dinitriles in a solvent at moderate temperatures using as catalysts tertiary phosphines or adducts of tertiary phosphines with zerovalent nickel catalysts derived from nickel carbonyl.

The acrylonitrile compounds especially suitable for use as starting materials for our invention are compounds having the formula

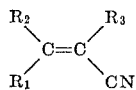

wherein $R_1$, $R_2$ and $R_3$ can be jointly or separately hydrogen, alkyl, or aryl radicals; preferably $R_3$ is hydrogen. The preferred compound is acrylonitrile; other acrylonitrile compounds include methacrylonitrile, phenyl acrylonitrile, ethacrylonitrile, cinnamonitrile, fumaronitrile, 2-cyano-3-methybutene-2, etc.

Branched, linear, or cyclic dinitrile dimers are formed by the process of this invention, depending on the particular catalyst and conditions employed in the reaction. Starting with acrylonitrile, the branched chain dimer 2-methyleneglutaronitrile, B.P. 103°/5 mm., which has the formula

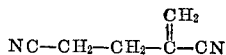

is usually formed in preponderant amounts together with minor amounts of other dimers and some polymer.

The tertiary phosphines used as catalysts include the trialkyl phosphines, tricycloalkyl phosphines, triaryl phosphines, and mixed alkyl aryl phosphines. The aryl group may be a heterocyclic radical. Examples of such tertiary phosphines include trimethyl phosphine, triethyl phosphine, tri(n-propyl)phosphine, tri(isopropyl) phosphine, tri(n-butyl)phosphine, tri(n-octyl)phosphine, triphenyl phosphine, tricyclohexyl phosphine, ethyl diphenyl phosphine, dichlorophenyl phosphine, and the like. The preferred phosphines are the trialkyl phosphines or mixed dialkyl aryl phosphines in which the alkyl group has from about 4 to 8 carbon atoms, and particularly tri(n-butyl) phosphine, tri(n-octyl)phosphine, and di(n-octyl)phenyl phosphine.

Zerovalent nickel adducts of the tertiary phosphines also serve as catalysts for this invention. These catalysts include compounds derived from nickel carbonyl having the formula

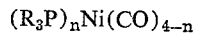

where R is an alkyl, aryl, or heterocyclic radical and $n$ has a value of one or two.

Suitable catalysts also include zerovalent nickel catalysts having the following formula

wherein A is a tertiary phosphine ($R_3P$) as defined above and B is acrylonitrile, cinnamonitrile, fumaronitrile, or acrolein.

Compounds having the above-defined general structure where A is zero (the parent compounds) have been reported in the preparation of a group of complexes having the formula Ni(ligand)$_2$ and the ligand is acrylonitrile, cinnamonitrile, or acrolein. These compounds are prepared, for example, by refluxing nickel carbonyl with the ligand for several hours in an anhydrous solvent or in a large volume of the participating ligand.

The adducts are prepared by refluxing the parent compound in a solution of the various tertiary phosphines under an inert atmosphere until there is a definite color change, using reaction times of from about 4 to 20 hours. The mono-adduct is obtained when the ratio of parent compound to ligand is 1:1. Generally, the bis-adduct is obtained only when the ligand is present in considerable excess. Exclusion of atmospheric oxygen is necessary; therefore, all operations such as loading the reaction vessel, filtering, drying, and weighing of complexes are performed in an inert atmosphere.

The yield of acrylonitrile dimer varies with the concentration of the catalyst. The catalyst is used in a concentration of about 0.1 to about 10 percent by weight of the acrylonitrile compound. Higher concentrations of catalyst seem to produce no more dimer, but may increase the amount of polymer. The optimum concentration varies with the particular phosphine used.

Alcohols may be used as co-catalysts with the tertiary phosphine catalysts. Certain alcohols are more effective than others. Those alcohols which have from three to about eighteen carbon atoms, with a probable optimum range of from three to ten carbon atoms, are preferred. The aliphatic alcohols may be primary, secondary, or tertiary alcohols having straight or branched chains and may contain unsaturated carbon-to-carbon linkages. A preferred alcohol for this purpose is isopropanol. Examples of suitable alcohols include isopropyl, n-butyl, tertiary butyl, isoamyl, tertiary amyl, benzyl, triphenyl carbinol, allyl, 1,1,5-H-octofluoro-1-pentanol, 2-methylpentanol, 2,2' - dimethylpentanol, n-hexyl, 2-ethylhexanol, hexadecyl, cyclohexanol, menthol, and the like. The presence of alcohol may reduce the amount of polymer that tends to form.

The specific concentration of the added alcohol is unimportant and may range from about 1 percent to about 20 percent.

There are some differences in the results produced with tertiary phosphine catalysts as compared with the nickel adducts of tertiary phosphines, although the two types of catalyst may be equally effective under appropriate operating conditions. Generally, the nickel adduct produces less of the unwanted polymer and can be used at higher concentrations. At concentrations of the nickel adduct greater than 3 percent with respect to solvent, increasing amounts of polymer may form, while the amount of dimer does not increase preceptibly. On the other hand, concentrations of trialkyl phosphine greater than about 1 percent may result in immediate and violent polymerization of the acrylonitrile. It is possible that the nickel adducts may control the release of the phosphine and thereby inhibit polymerization while catalyzing dimerization.

The yield of dimer also varies with temperature. The dimerization reaction may be carried out from below 0° C., such as to about —40° C., up to about 100° C. The preferred range is from about 20° to 60° C. With certain phosphines the reaction is rapid at 0° C. to room temperature; with others some heating is required.

Widely varying pressures may be used. By way of example, dimerization according to this invention make take place at atmospheric pressure. On the other hand, pressures as high as 100 atmospheres can also be utilized.

The dimerization reaction may be conducted in hydrocarbon solvents, such as benzene or xylene, or in polar aprotic solvents, such as dimethylformamide, dimethylacetamide, acetone, or acetonitrile. In hydrocarbon solution the addition of small amounts of alcohol appears to be beneficial, although some of the alcohol undergoes an equilibrium cyanoethylation reaction preferentially to the dimerization. The preferred solvent is acetonitrile. It has been found that unexpectedly high yields of the dimer are obtained when a solvent consisting essentially of acetonitrile is used.

A polymerization inhibitor such as p-tertiarybutyl catechol may also be added. The preferred amount is from about 0.1 to 5 percent by weight based on the acrylonitrile. A small amount of polymer is quickly formed in the acrylonitrile when less than 0.05 percent inhibitor is used.

The acrylonitrile is preferably added slowly, alone or mixed with solvent to a rapidly stirred dilute solution of catalyst. The time required for addition should be between about 0.5 to 2 hours. During this time the temperature should be held constant by the removal or addition of heat.

When the reaction is complete, the catalyst is neutralized by the addition of acid, preferably an organic acid such such as propionic acid. At this point additional inhibitor may be added to suppress further polymerization. The solvent and the unreacted acrylonitrile are removed by distillation, while maintaining the temperature below about 100° C. The remainder of the acetonitrile may be removed by azeotropic distillation, for example, with benzene. The phosphonium salt is separated from the crude dimer by extraction with dilute acid. The organic solution containing the dimer and the solvent used for azeotropic distillation is washed with water and with dilute sodium bicarbonate. The solvent is then distilled off. The crude dimer is recovered by vacuum distillation.

The catalyst is recycled by extraction of the aqueous solution with benzene or other solvent after the addition of caustic.

The invention will be more fully understood by reference to the following illustrative examples.

EXAMPLE 1

Into two 10 ml. stainless steel pressure tubes equipped with a valve at one end was charged a reaction mixture containing 0.5 g. of freshly ground calcium carbide, 0.3 ml. of a xylene solution containing 8.5% tri(n-butyl) phosphine, and finally, 3.0 ml. of acrylonitrile containing 0.1% of p-tertiarybutyl catechol as stabilizer. To one tube 0.15 ml. of tertiary butyl alcohol was added. After adding the ingredients, the tubes were purged with oxygen-free nitrogen and then heated in an oil bath for 3 hours at 70° C., for 4 more hours at 70° C., then 2½ hours at 110° C., and finally 16 more hours at 70° C. At each time interval samples were withdrawn and analyzed by vapor phase chromatography with the results shown in Table I.

TABLE I

| | Dimer formed, percent | |
| --- | --- | --- |
| | Alcohol present | Alcohol absent |
| 3 hrs. at 70° C | 3.2 | 2.6 |
| 7 hrs. at 70° C | 4.0 | 5.4 |
| Plus 2½ hrs. at 110° C | 8.1 | 7.0 |
| Plus 16 hrs. at 70° C | 13.5 | 8.7 |

Approximately 50% of the acrylonitrile was recovered unchanged.

EXAMPLE 2

Into a 10 ml. stainless steel pressure tube equipped with a valve at one end was charged a reaction mixture containing 0.5 g. of freshly ground calcium carbide, 6.0 ml. of acrylonitrile containing 0.1% of p-tertiary butyl catechol as stabilizer, 1.0 ml. of isopropanol, and 0.6 ml. of xylene containing bis[tri(n-butyl)phosphine]nickel dicarbonyl. After adding the ingredients, the tubes were purged with oxygen-free nitrogen and then heated in an oil bath for 2 hours at 80° C. The following concentrations of dimer were found:

TABLE II

| Catalyst conc., percent: | Yield dimer, percent |
| --- | --- |
| 0.1 | 1.3 |
| 0.5 | 2.0 |
| 1.0 | 5.2 |
| 2.0 | 11.0 |

Approximately 70% of the original acrylonitrile was present as such at the end of the reaction.

EXAMPLE 3

Tri-n-butylphosphine (0.5 ml.) was dissolved in 50 ml. of acetonitrile in a flask blanketed with nitrogen. The solution was stirred at a temperature at 45° C. while a solution of equal parts of acrylonitrile stabilized with 0.1% p-tertiary butyl catechol and acetonitrile was slowly added from a dropping funnel at a rate of about 20 ml./hr. The reaction proceeded rapidly to form dimer while the solution became colored. After about 25 to 30 ml. of solution was added (about 1½ hours), dimerization ceased. (If excess acrylonitrile were added, no harm would result.) The catalyst was neutralized by the addition of approximately 0.5 ml. of propionic acid.

Most of the acetonitrile and unreacted acrylonitrile were removed by distillation, while maintaining the temperature below 100° C. The remainder of the acetonitrile was removed by adding benzene (about 100 ml.) and distilling out the azeotrope (B.P. 71° C.; 34% acetonitrile). The crude product was in benzene solution together with the phosphonium salt. The latter was separated from the crude product by extraction with dilute aqueous sulfuric acid. The benzene solution was then washed with water and dilute sodium bicarbonate. The benzene was distilled and the crude product recovered by vacuum distillation, B.P. 100° C./5 ml.

The aqueous acid solution of the phosphine can be treated with alkali under inert atmosphere and extracted with benzene to recover the phosphine for recycle.

The yields of dimer are shown in Table III, employing the above procedure and the catalyst, solvent, and temperature indicated.

Acrolein and acrylonitrile are preferably distilled and stabilized with hydroquinone before use. Care is taken to remove atmospheric oxygen by flushing the reaction vessel with nitrogen before refluxing. The amount of nickel carbonyl used varies from 0.05 to 0.10 mole, while that of the ligand varies from 0.06 to 0.20 mole; how-

TABLE III.—CATALYTIC DIMERIZATION OF ACRYLONITRILE

| Solvent | Catalyst | Catalyst volume, ml. | Temp., °C. | Dimer yield, gms. |
| --- | --- | --- | --- | --- |
| Xylene | Triethylphosphine | 10 | 0 | Polymer |
| Do | Tri(n-butyl)phosphine | 2 | 40 | 4.2 |
| Do | Tri(n-octyl)phosphine | 2.5 | 0 | 4.0 |
| Do | do | 2.5 | 80 | 11.0 |
| Do | do | 0.5 | 40 | 4.0 |
| Do | Diphenyl ethyl phosphine | 10 | 0 | 2.0 |
| Do | do | 10 | 60 | 16.0 |
| Acetonitrile | Triethyl phosphine | 0.3 | 40 | 3.7 |
| Do | Tri(n-butyl)phosphine | 2.0 | 40 | 4.5 |
| Do | Tri(n-octyl)phosphine | 0.9 | 40 | 3.7 |
| Do | Diphenyl ethyl phosphine | 0.4 | 60 | 4.0 |
| Do | Di(n-octyl)phenyl phosphine | 0.6 | 50 | 5.8 |
| Dimethyl formamide | Tri(n-octyl)phosphine | 0.9 | 40 | 2.8 |
| Xylene | Triethyl phosphine nickel tricarbonyl | 2.0 | 50 | 1.1 |
| Do | Tri(n-butyl)phosphine nickel dicarbonyl | 2.6 | 40 | 2.2 |
| Acetonitrile | do | 2.6 | 40 | 7.2 |

Unusually high dimer yields were obtained when the solvent used was acetonitrile.

When the reaction was conducted using the same catalyst, catalyst volume and reaction temperature, higher yields were obtained with acetonitrile than with other solvents, as shown by the following data from Table III:

Tri(n-butyl)phosphine (2 ml. cat., 40° C.):
 Xylene: 4.2 grms. dimer
 Acetonitrile: 4.5 grms. dimer
Tri(n-octyl)phosphine (0.9 ml. cat., 40° C.):
 Dimethyl formamide: 2.8 grms. dimer
 Acetonitrile: 3.7 grms. dimer
Tri(n-butyl)phosphine nickel dicarbonyl (2.6 ml. cat., 40° C.):
 Xylene: 2.2 grms. dimer
 Acetonitrile: 7.2 grms. dimer In these three instances, the improvements in yields resulting from the use of acetonitrile as the solvent with all other factors constant were about 7 percent, 32 percent and 227 percent, respectively.

Similarly, when the reaction was conducted in the presence of the same catalyst and at the same temperature in most instances less catalyst was required to obtain equivalent yields when acetonitrile was used as the solvent, as shown by the following data from Table III:

Diphenyl ethyl phosphine (60° C.):
 Xylene (10 ml. cat.): 16.0 grms. dimer
 Acetonitrile (0.4 ml. cat): 4.0 grms. dimer In this case, in order to obtain a 400% gain in dimer yield with xylene, it was necessary to increase the catalyst amount by 2500%. Thus, the amount of catalyst required to obtain a given yield at a given temperature was reduced by the use of acetonitrile as the solvent.

The maximum yield under these conditions occurred using acetonitrile, when a yield of about 3.7 grams of dimer for 0.3 g. of triethyl phosphine or 40 moles of product per mole of catalyst was obtained. Conversion was about 35% with a selectivity of about 70–75/dimer and 25–30% polymer.

The triethylphosphine nickel tricarbonyl and bis[tri(n-butyl)phosphine]nickel dicarbonyl catalysts were prepared in a known manner by mixing at room temperature solutions of nickel carbonyl with solutions of the ligand in the ratio of 1:1 or 1:2 in order to obtain displacement of one or two carbon monoxide groups. Completion of the reaction was denoted by the absence of carbon monoxide evolution, after the reaction mixture had been allowed to stand over-night attached to a gas bubbler. The solvent was removed in a rotating evaporator to give the product in quantitative yields.

ever, in each case the ratio of nickel carbonyl to ligand is 1:2. During refluxing, carbon monoxide is evolved, which can be measured to determine whether the reaction is quantitative, and the crystalline complexes are formed. The complexes are filtered, washed with a solvent such as methanol and ether, and dried, for example, on a sintered glass funnel under nitrogen.

EXAMPLE 4

The dimer was prepared in a larger quantity by the method of Example 3 and recovered by vacuum distillation. It had the following properties: mol. wt. by mass spect. 106; B.P. 103° C./5 min.; freezing pt. −9.57° C.; $n_{25}^D = 1.45453$; $D_4^{25} = 0.9756$.

Utimate analysis.—Found (percent): C, 68.06; H, 5.74; N, 26.36. Theory (percent): C, 67.90; H, 5.70; N, 26.40.

Infrared absorption spectrum showed two nitrile peaks, one conjugated, and a methylene unsaturation conjugated with a nitrile group NMR spectroscopy showed an absence of methyl groups. The sample was hydrolyzed to the known 2-methyleneglutaric acid (melting point 132° C.); spectroscopically the methylene group was present. Reduction by hydrogen gave 2-methylglutaric acid, M.P. 76° C., no depression when mixed with an authenic sample of 2-methylglutaric acid and had the identical infrared absorption spectrum when measured on a KBr pellet. NMR showed the presence of a methyl group. The original dimer, therefore, is 2-methyleneglutaronitrile:

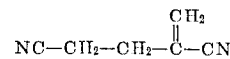

While particular embodiments of this invention are shown above, it will be understood that the invention is obviously subject to variations and modifications without departnig from its broader aspects.

What is claimed is:

1. In the process for the preparation of 2-methyleneglutaronitrile which comprises dimerizing acrylonitrile at a temperature within the range of about −40° C. to 100° C., in the presence of a catalyst selected from the group consisting of trimethyl phosphine, triethyl phosphine, tri(n-propyl) phosphine, tri(isopropyl) phosphine, tri(n-butyl) phosphine, tri(n-octyl) phosphine, triphenyl phosphine, ethyl diphenyl phosphine, di(n-octyl) phenyl phosphine, tricyclohexyl phosphine, dichlorophenyl phosphine and tri(n-butyl) phopsphine nickel dicarbonyl, said catalyst being present in an amount equal to about 0.1 to 10 percent by weight based on the acrylonitrile, the improvement wherein the reaction takes place in a solvent consisting essentially of acetonitrile.

References Cited

UNITED STATES PATENTS

| | | | |
|---|---|---|---|
| 3,562,311 | 2/1971 | McClure | 260—465.8 D |
| 3,567,759 | 3/1971 | Tullio | 260—465.8 D |
| 2,956,075 | 10/1960 | Boffa et al. | 260—465.8 D |
| 3,375,237 | 3/1968 | Baizer | 260—465.8 D UX |
| 3,013,066 | 12/1961 | Alderson | 260—465.8 D X |

OTHER REFERENCES

The Merck Index, 7th ed., 1960, p. 8.
The Condensed Chemical Dictionary, 6th ed., 1961, p. 9.

JOSEPH P. BRUST, Primary Examiner